United States Patent [19]

Passariello

[11] 4,073,749
[45] Feb. 14, 1978

[54] PROCESS FOR MANUFACTURING A CATALYST FOR THE SYNTHESIS OF AMMONIA AND PRODUCT THEREBY OBTAINED

[75] Inventor: Attilio Passariello, Tivoli (Rome), Italy

[73] Assignee: S.I.R.I. Societa' Italiana Ricerche Industriali S.p.A., Terni, Italy

[21] Appl. No.: 642,152

[22] Filed: Dec. 18, 1975

[51] Int. Cl.² .......................... B01J 29/14; B01J 23/76
[52] U.S. Cl. ............................... 252/455 R; 252/466 J
[58] Field of Search ........................ 252/466 J, 455 R

[56] References Cited

U.S. PATENT DOCUMENTS

| | | | |
|---|---|---|---|
| 1,771,130 | 7/1930 | Larson | 252/466 J X |
| 2,567,297 | 9/1951 | Milligan et al. | 252/466 J X |
| 3,243,386 | 3/1966 | Nielsen et al. | 252/455 R |
| 3,755,199 | 8/1973 | Stefanescu et al. | 252/466 J X |
| 3,839,229 | 10/1974 | Senes et al. | 252/455 R |

FOREIGN PATENT DOCUMENTS

| | | | |
|---|---|---|---|
| 1,300,520 | 8/1969 | Germany | 252/466 J |
| 1,080,838 | 8/1967 | United Kingdom | 252/466 J |
| 210,103 | 7/1970 | U.S.S.R. | 252/466 J |

*Primary Examiner*—Patrick P. Garvin
*Assistant Examiner*—William G. Wright
*Attorney, Agent, or Firm*—Barnes, Kisselle, Raisch & Choate

[57] ABSTRACT

A process for manufacturing a spherical catalyst comprising magnetite, aluminum oxide, potash, calcium oxide and magnesium oxide, for the ammonia synthesis, comprising: melting the charge in a furnace, preferably of the resistance type, at a temperature not lower than 1600° C., granulating the mass in a dish granulator, after the addition of water and bentonite, dehydrating and sintering the granulate product.

2 Claims, 1 Drawing Figure

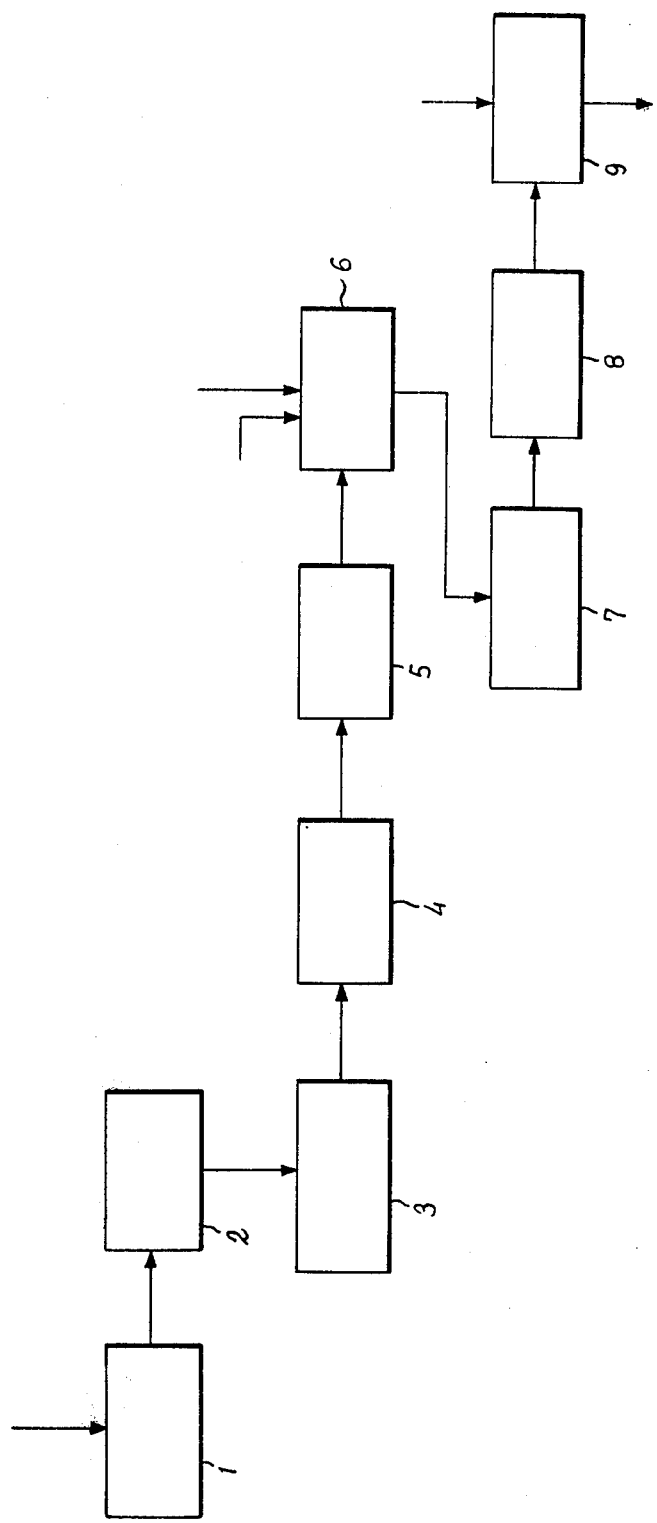

PROCESS FOR MANUFACTURING A CATALYST FOR THE SYNTHESIS OF AMMONIA AND PRODUCT THEREBY OBTAINED

The present invention relates to a process for manufacturing a catalyst for the synthesis of ammonia.

It is known that the synthesis of ammonia is industrially obtained by direct combination of the elements, by means of a catalyst consisting, in its raw state, by magnetite activated with various promotors.

Said catalyst is available in the form of irregular grains or of pastilles, and this implies, for the type in grains, a lack of uniformity of the distribution of the synthesis gas inside the reactor, difficulties when the catalyst is charged, and particularly when it is discharged, due to the irregular form of the grains, which determines also a non-uniform distribution of the temperature inside the reactor. In the pastille type, besides a high loss of charge, there is the drawback of the tendency of the pastilles to disaggregate, as these pastilles are obtained by a manufacturing process consisting in compressing the powder of the prereduced and passivated catalyst, obtaining thus a product which has a reduced mechanical strenght.

In order to obviate said inconveniences, certain attempts have been made for obtaining a catalyst in the form of spherical granules.

In this connection reference is made to the British Pat. No. 1238046, wherein, however, the stiff tempering action caused by the water layers, used as cooling fluid of the catalyst particules which are taking a spherical form while passing through said layers, impart to the catalyst a crystalline structure different from that formed at high temperature and with which the catalyst would have a high activity.

The purpose of the present invention is that of obtaining a catalyst having a spherical shape, by a process which maintains unaltered the crystalline structure of the catalyst, obtained at high temperature, and of overcoming the drawbacks and disadvantages characteristic of the catalysts of the types in grains or in pastilles.

A further purpose of the present invention is that of providing a process for manufacturing a catalyst for the synthesis of ammonia which due to the characteristics themselves of the manufacturing process and to the form of the obtained product, allows a catalyst having a high activity to be obtained, with low charge losses, having a high resistance against the mechanical stresses, easily usable and allowing a uniform distribution of the synthesis gas and of the temperatures inside the reactor, with a consequent easy checking of the operation of the plant.

In the process according to the present invention, the catalyst is obtained by melting, in a furnace, preferably of the resistance-type with a temperature not lower than 1600° C., and for a duration of melting treatment depending upon the amount of substance and the voltage applied to the electrodes, of magnetite mixed with calcium, magnesium and aluminum oxides, and with potash. The cooled mass will be ground and subsequently granulated by mixing with bentonite and water; the obtained spherical granules are dried in a low temperature furnace and, subsequently treated in the same furnace, under controlled atmosphere, until an initial melting occurs.

The present invention will be now described with reference to the attached drawing showing diagrammatically, the process according to the invention itself.

With reference to the drawing: the numeral reference 1 denotes the mixer for the charge powder, consisting of magnetite, aluminum oxide, potash, calcium oxide, and magnesium oxide. The percent by weight of said promotors, can vary, by weight, within the intervals: 2.0 – 3.5 aluminum oxide; 0.8 – 2 potash; 2 – 3.5 calcium oxide; 0.1 – 0.4 magnesium oxide, respectively.

From said mixer, the charge is transferred to the furnace 2, preferably of the resistance-type, and melted at temperature not less than 1600° C. When the melting stage is ended, the mass is first left to solidify and cool, in air, in the crucible inside the furnace, then the mass 3 is removed from the crucible, further cooled in air and freed from the slag. The obtained mass is then manually crushed in 4 and then powdered in the bar mill 5, then added in the mixer 6, first with the percent by weight of bentonite variable from 0.25 to 0.30 and subsequently with water, in the percent by weight variable from 7.5 to 8.5. After a subsequent pulverization for homogeneization in the disc pulverizing device, the powder will be transferred to the dish granulator 8 allowing the catalyst to be obtained in the form of spherical granules, with a diameter variable according to the tilt of the disc and of the amount of the charge.

The obtained spherical granules are then treated in the furnace 9 preferably of the radiation type, for a preliminary drying stage at 100°–200° C., and the sequential sintering treatment, in argon atmosphere at 1250°–1350° C.

By way of non limitative example of the process for manufacturing the catalyst according to this invention, the following example is cited.

EXAMPLE

A charge consisting of 200 kgs of natural magnetite, 4.6 kgs of aluminum oxide, 2.7 kgs of potash, 6.7 kgs of calcium oxide, and 0.28 kg of magnesium oxide, is placed in a mixer and subsequently melted at 1600° C within the interval of one hour.

The mass obtained by melting, after solidifying by cooling in air within the crucible, is removed from said crucible and after completion of its cooling, the mass is freed from the slag, crushed and powdered. To the obtained powder the 0.25% by weight of bentonite and 8.0% by weight of water are added, and the product is subsequently powdered again.

The product after a granulation treatment, appears to be in the form of spherical granules diametered 10–12 mm and is treated in the radiation furnace for the preliminary drying stage at 150° C., and the subsequent treatment in said furnace, in argon atmosphere at 1350° C.

The produced catalyst has been tested in an experimental reactor obtaining the data as shown in the following table which refer, for laboratory needs, to a spherical catalyst having a diameter comprised in the interval from 1.5 to 2.5 mm.

TABLE

| | ACTIVITY MEASURES | |
|---|---|---|
| | | : 5 cc |
| | | : 13.4 g |
| | Catalyst volume | : 315 abs Atm. (within the reactor) |
| | Weight | |
| | Pressure | : $H^{-1}$ 10000 ÷ 35000 |
| | Spatial velocity | : 400 – 500° C |
| | Temperature | : $H_2 : N_2 = 3 : 1$ |
| Test conditions: | Feeding gas | % $NH_3$ |
| t° C | S.V.$H^{-1}$ | OUTFLOW GAS |
| 400 | 12500 | 21.2 |
| 400 | 21400 | 16.6 |

TABLE-continued
ACTIVITY MEASURES

| Test conditions: t° C | Catalyst volume Weight Pressure Spatial velocity Temperature Feeding gas S.V.H$^{-1}$ | : 5 cc : 13.4 g : 315 abs Atm. (within the reactor) : H$^{-1}$ 10000 ÷ 35000 : 400 - 500° C : H$_2$ : N$_2$ = 3 : 1 % NH$_3$ OUTFLOW GAS |
|---|---|---|
| 400 | 32300 | 14.2 |
| 450 | 13100 | 26.6 |
| 450 | 23500 | 23.6 |
| 450 | 33000 | 20.7 |
| 475 | 14100 | 26.7 |
| 475 | 21900 | 25.0 |
| 475 | 31100 | 23.6 |
| 500 | 12600 | 24.3 |
| 500 | 23100 | 23.4 |
| 500 | 32400 | 22.3 |

The catalyst has been also submitted to thermal resistance test, consisting in determining the loss of activity at the same test conditions, before and after the same charge has been maintained for 10 hours at 600° C., and at 315 abs. atm. and a spatial velocity equalling 20000. From the measures carried out it appeared that the catalyst has maintained its initial activity.

If a whatever type of reactor for the synthesis of ammonia is taken into consideration, its dimensions will be defined, for a given production and pressure, by the specific activity of the catalyst and by the permissible loss of charge in the gas and thus finally by the size of the grains of the catalyst: the selection of the size of the grains is therefore always a compromise between a high specific activity of a catalyst having little size of the grains (with the consequent high loss of charge) and the lower specific activity of a catalyst having greater size of the grains which causes a low loss of charge. By using the catalyst according to the present invention it will be possible to select, at parity of loss of charge, a size of grains minor than that of a catalyst in grains, obtaining thereby, also due to the high porosity of the catalyst according to the present invention, an active surface greater than that which would be obtained if a catalyst in grains should be used, having such size as to produce the same loss of charges, and a loss of charge remarkably minor than that caused by a catalyst in pastilles having the same active surface as the catalyst according to the present invention.

The present invention has been described and illustrated in one preferred embodiment, being however understood that variations and changes with respect thereto might be practically adopted without departing from the scope of this invention.

Having thus described the present invention, what is claimed is:

1. A process for manufacturing a pellettized magnetite catalyst containing aluminum oxide, potash, calcium oxide as promoters and magnesium oxide, the percent by weight of said parameters being within 2.0 - 3.5 aluminum oxide, 0.8 - 2 potash, 2 - 3.5 calcium oxide and 0.1 - 0.4 magnesium oxide, consisting essentially of mixing the components, melting the mixture in a furnace at a temperature of at least 1600° C, cooling the melted mass in air, removing melted slag, crushing and powdering the remaining solid mass, adding water and bentonite, mixing the crushed and powdered mass, water and bentonite, granulating said mixture, dehydrating the granulate product at a temperature between 100° and 200° C, and sintering the granulates in an argon atmosphere at a temperature ranging between 1250° and 1350° C.

2. A process as claimed in claim 1, wherein bentonite and water are added to the powdered product in an amount of 0.25 and 8% by weight, respectively.

* * * * *